United States Patent
Ophir et al.

(10) Patent No.: US 12,282,097 B2
(45) Date of Patent: Apr. 22, 2025

(54) SYSTEMS AND METHODS FOR GENERATING FOCUSED THREEDIMENSIONAL (3D) POINT CLOUDS

(71) Applicant: ELBIT SYSTEMS LTD., Haifa (IL)

(72) Inventors: Yoav Ophir, Haifa (IL); Dan Hakim, Haifa (IL); Assaf David, Haifa (IL); Tamir Demri, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 18/498,087

(22) Filed: Oct. 31, 2023

(65) Prior Publication Data
US 2024/0094396 A1 Mar. 21, 2024

Related U.S. Application Data

(63) Continuation of application No. PCT/IL2022/050493, filed on May 12, 2022.

(30) Foreign Application Priority Data

May 18, 2021 (IL) .......................................... 283638

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4817* (2013.01); *G01S 7/486* (2013.01); *G01S 7/4868* (2013.01);
(Continued)

(58) Field of Classification Search
CPC ...... G01S 7/4808; G01S 7/4817; G01S 7/486; G01S 7/4868; G01S 13/10; G01S 13/32;
(Continued)

(56) References Cited

U.S. PATENT DOCUMENTS

| 9,383,753 B1 | 7/2016 | Templeton et al. |
| 2004/0169663 A1 | 9/2004 | Bernier |

(Continued)

FOREIGN PATENT DOCUMENTS

| EP | 3516421 A2 | 7/2019 |
| EP | 3608231 A1 | 2/2020 |

(Continued)

*Primary Examiner* — Yuqing Xiao
*Assistant Examiner* — Benjamin Richard Hebert
(74) *Attorney, Agent, or Firm* — S.J. Intellectualual Property Ltd.

(57) ABSTRACT

A system and method for generating a focused three-dimensional (3D) point cloud is disclosed. A respective 3D point cloud is generated based on returns of a respective sequence of energy pulses that is emitted towards one or more regions-of-interest (ROIs) within a field-of-view (FOV) during a respective scan of the FOV, the returns including one or more secondary returns from one or more points within the FOV. During an additional scan of the FOV, subsequent to the respective scan, an additional sequence of energy pulses is emitted to generate a focused 3D point cloud that includes additional information regarding one or more selected points of the points associated with the secondary returns relative to the respective 3D point cloud.

15 Claims, 3 Drawing Sheets

(51) Int. Cl.
  *G01S 7/486*   (2020.01)
  *G01S 13/10*   (2006.01)
  *G01S 13/32*   (2006.01)
  *G01S 17/66*   (2006.01)
  *G06T 19/00*   (2011.01)
(52) U.S. Cl.
  CPC .............. *G01S 13/10* (2013.01); *G01S 13/32* (2013.01); *G06T 19/00* (2013.01); *G01S 17/66* (2013.01); *G06T 2210/56* (2013.01)
(58) Field of Classification Search
  CPC ......... G01S 17/66; G01S 17/89; G06T 19/00; G06T 2210/56
  See application file for complete search history.

(56) References Cited

U.S. PATENT DOCUMENTS

| | | | |
|---|---|---|---|
| 2008/0075326 A1 | 3/2008 | Otani et al. | |
| 2016/0274589 A1* | 9/2016 | Templeton | ............... G01S 17/89 |
| 2016/0356890 A1* | 12/2016 | Fried | ................... G01S 7/4863 |
| 2017/0269198 A1 | 9/2017 | Hall et al. | |
| 2017/0269209 A1 | 9/2017 | Velodyne | |
| 2018/0017680 A1 | 1/2018 | Pennecot et al. | |
| 2018/0113216 A1* | 4/2018 | Kremer | ................... G01S 17/42 |
| 2018/0120424 A1* | 5/2018 | Eshel | ................... G01S 7/4808 |
| 2018/0149732 A1 | 5/2018 | Droz et al. | |
| 2018/0156896 A1 | 6/2018 | O'Keeffe | |
| 2018/0284244 A1 | 10/2018 | Russell et al. | |
| 2018/0329204 A1* | 11/2018 | Smits | ................... G02B 26/105 |
| 2018/0348372 A1* | 12/2018 | Belsley | ................... G01S 17/89 |
| 2019/0086550 A1* | 3/2019 | Dussan | ............. G02B 19/0028 |
| 2019/0107607 A1 | 4/2019 | Danziger | |
| 2019/0107623 A1* | 4/2019 | Campbell | ............. G01S 17/931 |
| 2019/0317217 A1 | 10/2019 | Day et al. | |
| 2020/0041618 A1* | 2/2020 | Pelz | ....................... G01S 7/4815 |
| 2020/0191969 A1 | 6/2020 | Shultz et al. | |
| 2020/0386872 A1 | 12/2020 | Keilaf et al. | |
| 2021/0096260 A1* | 4/2021 | Vets | ....................... G01S 7/4868 |
| 2021/0382165 A1* | 12/2021 | Choi | ....................... G01S 3/023 |

FOREIGN PATENT DOCUMENTS

| | | |
|---|---|---|
| KR | 20150143154 A | 12/2015 |
| WO | 2018055449 A2 | 3/2018 |

* cited by examiner

SYSTEMS AND METHODS FOR GENERATING FOCUSED THREEDIMENSIONAL (3D) POINT CLOUDS

TECHNICAL FIELD

The invention relates to systems and methods for generating focused three-dimensional (3D) point clouds.

BACKGROUND

An active 3D scanner, such as a Light Detection and Ranging (LiDAR), can be configured to scan a field-of-view (FOV) of at least one detector of the active 3D scanner. In accordance with the scan, a high-resolution 3D point cloud of the FOV can be generated.

For various reasons, it may be desirable to obtain additional information regarding one or more objects within the scanned FOV than is available in a standard 3D point cloud.

Thus, there is a need in the art for new systems and methods for generating focused 3D point clouds that include such additional information.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2017/0269198 ("Hall et al."), published on Sep. 21, 2017, describes methods and systems for performing three-dimensional Light Detection and Ranging (LIDAR) measurements with varying illumination field density. A LIDAR device includes a plurality of pulse illumination sources and corresponding detectors. The current pulses supplied to the pulse illumination sources are varied to reduce total energy consumption and heat generated by the LIDAR system. In some embodiments, the number of active pulse illumination sources is varied based on the orientation of the LIDAR device, the distance between the LIDAR device and an object detected by the LIDAR device, an indication of an operating temperature of the LIDAR device, or a combination thereof. In some embodiments, the number of active pulse illumination sources is varied based on the presence of an object detected by the LIDAR device or another imaging system.

U.S. Patent Application Publication No. 2017/0269209 ("Hall et al."), published on Sep. 21, 2017, describes methods and systems for performing three-dimensional LIDAR measurements with different pulse repetition patterns. Each repetitive pattern is a sequence of measurement pulses that repeat over time. In one aspect, the repetition pattern of a pulsed beam of illumination light emitted from a LIDAR system is varied to reduce total energy consumption and heat generated by the LIDAR system. In some examples, the repetitive pattern is varied by skipping a number of pulses. In some examples, the repetitive pattern of pulses of illumination light emitted from the LIDAR system is varied by changing a repetition rate of the sequence of emitted pulses. In some examples, the pulse repetition pattern is varied based on the orientation of the LIDAR device. In some examples, the repetition pattern is varied based on an object detected by the LIDAR device or another imaging system.

U.S. Patent Application Publication No. 2018/0120424 ("Eshel et al."), published on May 3, 2018, provides a LIDAR system. The LIDAR system comprises at least one processor configured to: control at least one light source in a manner enabling light flux to vary over a scan of a field of view, the field of view including a first portion and a second portion; receive on a pixel-by-pixel basis, signals from at least one sensor; estimate noise in at least some of the signals associated with the first portion of the field of view; alter a sensor sensitivity for reflections associated with the first portion of the field of view; estimate noise in at least some of the signals associated with the second portion of the field of view; and alter a sensor sensitivity for reflections associated with the second portion of the field of view based on the estimation of noise in the second portion of the field of view.

U.S. Patent Application Publication No. 2018/0284244 ("Russell et al."), published on Oct. 4, 2018, discloses a controller that identifies a triggering event and provides a control signal to a light source in a lidar system that adjusts the power of light pulses provided by the light pulse, thereby dynamically controlling power in the lidar system. Triggering events may include exceeding a threshold speed, being within a threshold distance of a person or other object, an atmospheric condition, etc. In some scenarios, the power is adjusted to address eye-safety concerns.

GENERAL DESCRIPTION

In accordance with a first aspect of the presently disclosed subject matter, there is provided a system for generating a focused three-dimensional (3D) point cloud, the system comprising: an active 3D scanner, comprising: at least one detector; a scanning mechanism configured to scan a field-of-view (FOV) of the at least one detector; and at least one energy emitting source configured to emit energy pulses, in synchronization with the scanning mechanism; and a processing circuitry configured to: provide an objects data repository comprising point cloud representations of one or more potential objects within the FOV; during a first scan of the FOV, control the at least one energy emitting source to emit first energy pulses towards one or more regions-of-interest (ROIs) within the FOV, being part or all of the FOV, in synchronization with the scanning mechanism; obtain first readings, from the at least one detector, based on first returns of the first energy pulses, giving rise to a first 3D point cloud; analyze the first 3D point cloud, using the point cloud representations of the one or more potential objects, to identify one or more existing objects within the first 3D point cloud; during a subsequent scan of the FOV, subsequent to the first scan, control the at least one energy emitting source to emit second energy pulses, wherein the second energy pulses directed at one or more selected objects of the existing objects are greater in number than the first energy pulses directed at the selected objects; and obtain subsequent readings, from the at least one detector, based on second returns of the second energy pulses, giving rise to the focused 3D point cloud including more information associated with the selected objects than the first 3D point cloud.

In some cases, the existing objects include at least the selected objects and a second object not included in the selected objects, and the second energy pulses directed at the second object are less in number than the first energy pulses directed at the second object.

In some cases, the processing circuitry is further configured to select one or more of the selected objects.

In some cases, at least one of the selected objects is a predefined object, predefined prior to performing the first scan of the FOV.

In some cases, at least one of the selected objects is selected based on a line-of-sight between a user of the system and the selected objects.

In some cases, prior to identifying the existing objects, the processing circuitry is further configured to utilize a terrain elevation model to identify points of the first 3D point cloud that are associated with a terrain as indicated by the terrain elevation model.

In some cases, the processing circuitry is configured to: obtain mapping designation information; and designate the ROIs within the FOV, based on the mapping designation information.

In some cases, at least some of the mapping designation information is obtained from a tracker that tracks a line-of-sight between a user of the system and the FOV.

In some cases, at least some of the mapping designation information is associated with one or more fixed coordinate areas within the FOV having fixed coordinates in a fixed coordinate system established in space, and the processing circuitry is further configured to: upon identifying a change in at least one of a position or an orientation of the at least one detector relative to the fixed coordinate areas, update a designation of the ROIs within the FOV that are associated with the fixed coordinate areas based on the change.

In some cases, at least some of the mapping designation information is associated with one or more moving objects within the FOV, and the processing circuitry is further configured to: upon identifying a change in at least one of a position or an orientation of the at least one detector relative to the moving objects, update a designation of the ROIs within the FOV that are associated with the moving objects based on the change.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a second aspect of the presently disclosed subject matter, there is provided a system for generating a focused three-dimensional (3D) point cloud, the system comprising: an active 3D scanner, comprising: at least one detector; a scanning mechanism configured to scan a field-of-view (FOV) of the at least one detector; and at least one energy emitting source configured to emit energy pulses, in synchronization with the scanning mechanism; and a processing circuitry configured to: during a respective scan of the FOV, control the at least one energy emitting source to emit a respective sequence of respective energy pulses towards one or more regions-of-interest (ROIs) within the FOV, in synchronization with the scanning mechanism; obtain respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV; control the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points relative to the respective 3D point cloud; and obtain additional readings, from the at least one detector, based on additional returns of the additional energy pulses, giving rise to the focused 3D point cloud.

In some cases, for one or more given points of the selected points, the additional energy pulses that are emitted towards the given points strike the given points at a first angle of incidence that is different than a second angle of incidence at which the respective energy pulses that are emitted towards the given points strike the given points, wherein the given points are mapped in the focused 3D point cloud to reflect the secondary returns of the respective energy pulses that are emitted towards the given points and the additional returns of the additional energy pulses that are emitted towards the given points.

In some cases, for one or more given points of the selected points, the additional energy pulses that are emitted towards the given points are greater in number than the respective energy pulses that are emitted towards the given points.

In some cases, the processing circuitry is further configured to: analyze the respective readings to determine one or more parameters that are associated with the secondary returns; and select the selected points based on one or more of the parameters.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a third aspect of the presently disclosed subject matter, there is provided a method for generating a focused three-dimensional (3D) point cloud, the method comprising: providing an objects data repository comprising point cloud representations of one or more potential objects within a field-of-view (FOV) of at least one detector of an active 3D scanner; during a first scan of the FOV by a scanning mechanism of the active 3D scanner, controlling at least one energy emitting source of the active 3D scanner to emit first energy pulses towards one or more regions-of-interest (ROIs) within the FOV, being part or all of the FOV, in synchronization with the scanning mechanism; obtaining first readings, from the at least one detector, based on first returns of the first energy pulses, giving rise to a first 3D point cloud; analyzing the first 3D point cloud, using the point cloud representations of the one or more potential objects, to identify one or more existing objects within the first 3D point cloud; during a subsequent scan of the FOV by the scanning mechanism, subsequent to the first scan, controlling the at least one energy emitting source to emit second energy pulses, wherein the second energy pulses directed at one or more selected objects of the existing objects are greater in number than the first energy pulses directed at the selected objects; and obtaining subsequent readings, from the at least one detector, based on second returns of the second energy pulses, giving rise to the focused 3D point cloud including more information associated with the selected objects than the first 3D point cloud.

In some cases, the existing objects include at least the selected objects and a second object not included in the selected objects, and wherein the second energy pulses directed at the second object are less in number than the first energy pulses directed at the second object.

In some cases, the method further comprises: selecting one or more of the selected objects.

In some cases, at least one of the selected objects is a predefined object, predefined prior to performing the first scan of the FOV.

In some cases, at least one of the selected objects is selected based on a line-of-sight between a user and the selected objects.

In some cases, the method further comprises: prior to identifying the existing objects, utilizing a terrain elevation model to identify points of the first 3D point cloud that are associated with a terrain as indicated by the terrain elevation model.

In some cases, the method further comprises: obtaining mapping designation information; and designating the ROIs within the FOV, based on the mapping designation information.

In some cases, at least some of the mapping designation information is obtained from a tracker that tracks a line-of-sight between a user and the FOV.

In some cases, at least some of the mapping designation information is associated with one or more fixed coordinate areas within the FOV having fixed coordinates in a fixed coordinate system established in space, and the method further comprises: upon identifying a change in at least one of a position or an orientation of the at least one detector relative to the fixed coordinate areas, updating a designation of the ROIs within the FOV that are associated with the fixed coordinate areas based on the change.

In some cases, at least some of the mapping designation information is associated with one or more moving objects within the FOV, and the method further comprises: upon identifying a change in at least one of a position or an orientation of the at least one detector relative to the moving objects, updating a designation of the ROIs within the FOV that are associated with the moving objects based on the change.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a fourth aspect of the presently disclosed subject matter, there is provided a method for generating a focused three-dimensional (3D) point cloud, the method comprising: during a respective scan of a field-of-view (FOV) of at least one detector of an active 3D scanner by a scanning mechanism of the active 3D scanner, controlling at least one energy emitting source of the active 3D scanner to emit a respective sequence of respective energy pulses towards one or more regions-of-interest (ROIs) within the FOV, in synchronization with the scanning mechanism; obtaining respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV; controlling the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points relative to the respective 3D point cloud; and obtaining additional readings, from the at least one detector, based on additional returns of the additional energy pulses, giving rise to the focused 3D point cloud.

In some cases, for one or more given points of the selected points, the additional energy pulses that are emitted towards the given points strike the given points at a first angle of incidence that is different than a second angle of incidence at which the respective energy pulses that are emitted towards the given points strike the given points, wherein the given points are mapped in the focused 3D point cloud to reflect the secondary returns of the respective energy pulses that are emitted towards the given points and the additional returns of the additional energy pulses that are emitted towards the given points.

In some cases, for one or more given points of the selected points, the additional energy pulses that are emitted towards the given points are greater in number than the respective energy pulses that are emitted towards the given points.

In some cases, the method further comprises: analyzing the respective readings to determine one or more parameters that are associated with the secondary returns; and selecting the selected points based on one or more of the parameters.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a fifth aspect of the presently disclosed subject matter, there is provided a non-transitory computer readable storage medium having computer readable program code embodied therewith, the computer readable program code, executable by processing circuitry of a computer to perform a method for generating a focused three-dimensional (3D) point cloud, the method comprising: providing an objects data repository comprising point cloud representations of one or more potential objects within a field-of-view (FOV) of at least one detector of an active 3D scanner; during a first scan of the FOV by a scanning mechanism of the active 3D scanner, controlling at least one energy emitting source of the active 3D scanner to emit first energy pulses towards one or more regions-of-interest (ROIs) within the FOV, being part or all of the FOV, in synchronization with the scanning mechanism; obtaining first readings, from the at least one detector, based on first returns of the first energy pulses, giving rise to a first 3D point cloud; analyzing the first 3D point cloud, using the point cloud representations of the one or more potential objects, to identify one or more existing objects within the first 3D point cloud; during a subsequent scan of the FOV by the scanning mechanism, subsequent to the first scan, controlling the at least one energy emitting source to emit second energy pulses, wherein the second energy pulses directed at one or more selected objects of the existing objects are greater in number than the first energy pulses directed at the selected objects; and obtaining subsequent readings, from the at least one detector, based on second returns of the second energy pulses, giving rise to the focused 3D point cloud including more information associated with the selected objects than the first 3D point cloud.

In accordance with a sixth aspect of the presently disclosed subject matter, there is provided a non-transitory computer readable storage medium having computer readable program code embodied therewith, the computer readable program code, executable by processing circuitry of a computer to perform a method for generating a focused three-dimensional (3D) point cloud, the method comprising: during a respective scan of a field-of-view (FOV) of at least one detector of an active 3D scanner by a scanning mechanism of the active 3D scanner, controlling at least one energy emitting source of the active 3D scanner to emit a respective sequence of respective energy pulses towards one or more regions-of-interest (ROIs) within the FOV, in synchronization with the scanning mechanism; obtaining respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV; controlling the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points relative to the respective 3D point cloud; and obtaining additional readings, from the at least one detector, based on additional returns of the additional energy pulses, giving rise to the focused 3D point cloud.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
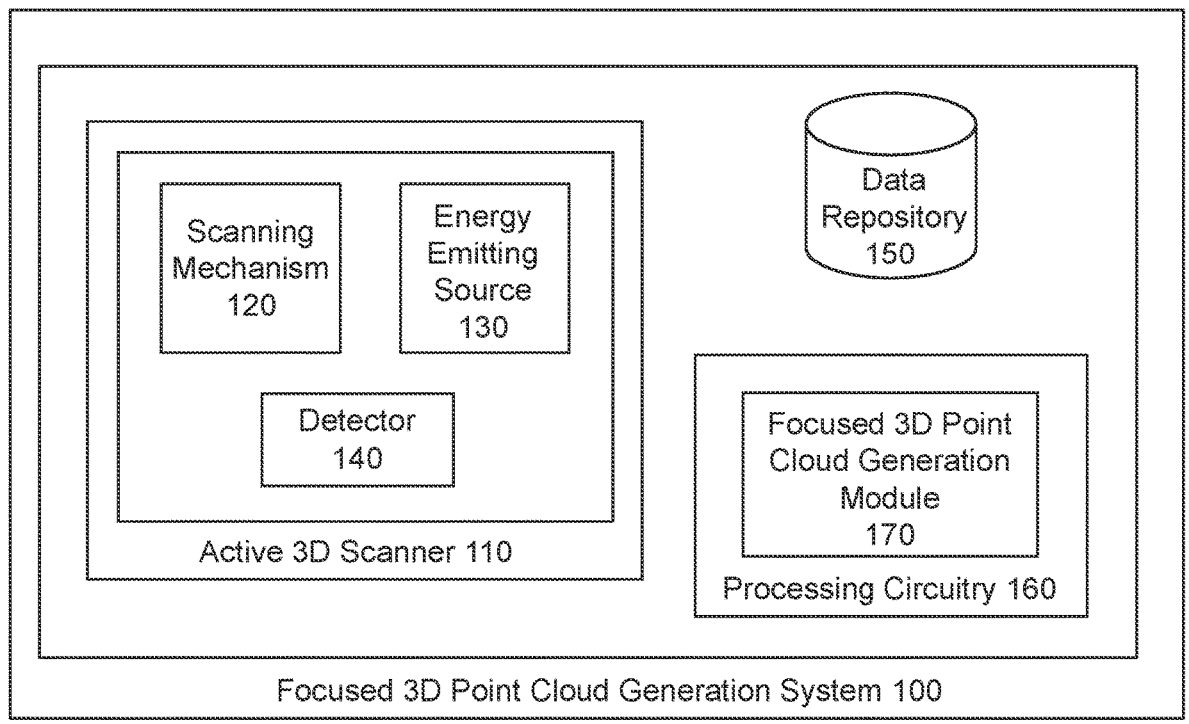
FIG. 1 is a block diagram schematically illustrating one example of a focused 3D point cloud generation system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "controlling", "obtaining", "analyzing", "identifying", "selecting", "designating", "updating", "emitting" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
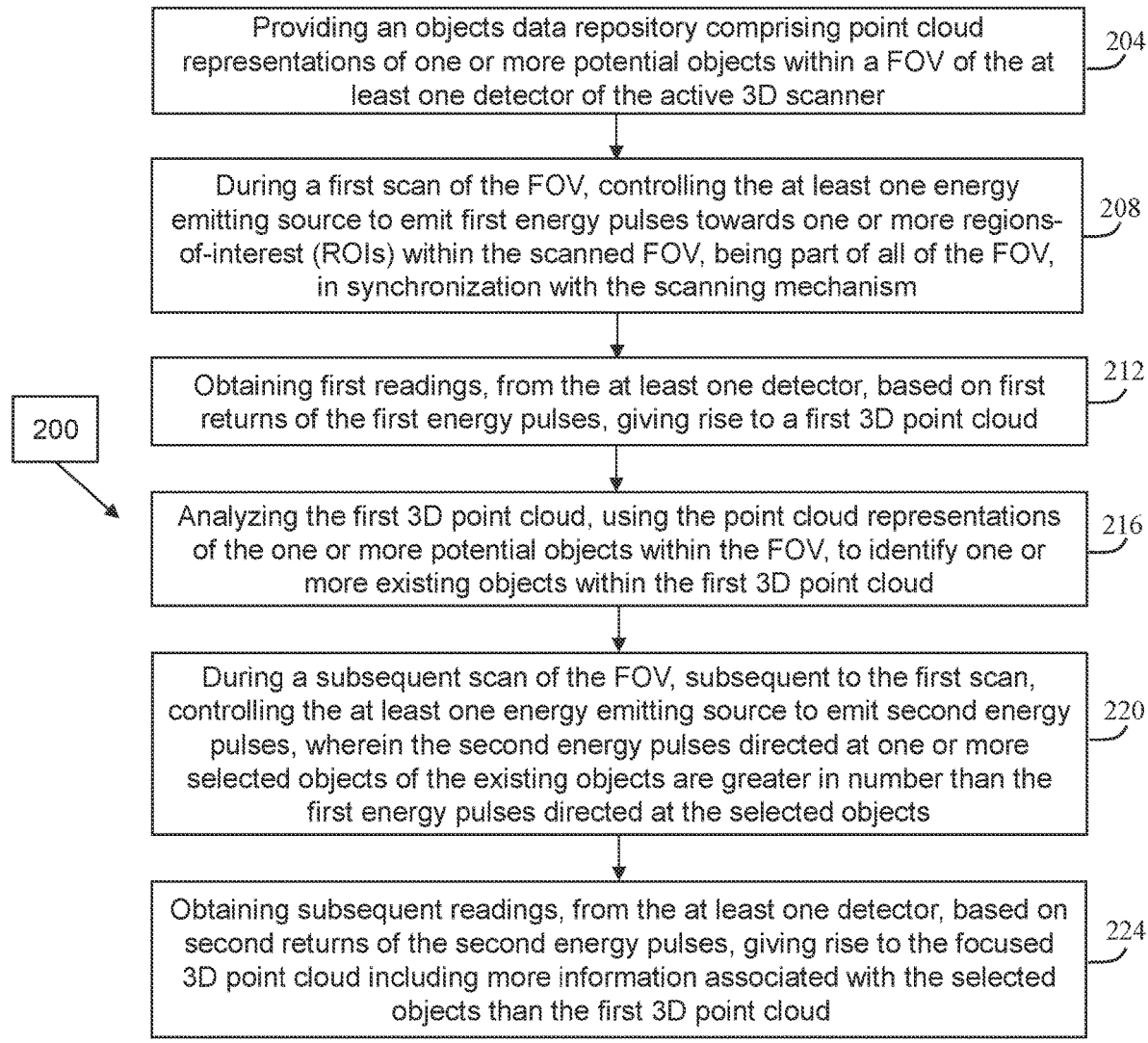
FIG. 2 is a flowchart illustrating a first example of a sequence of operations for generating a focused 3D point cloud, in accordance with the presently disclosed subject matter.
Figure 3:
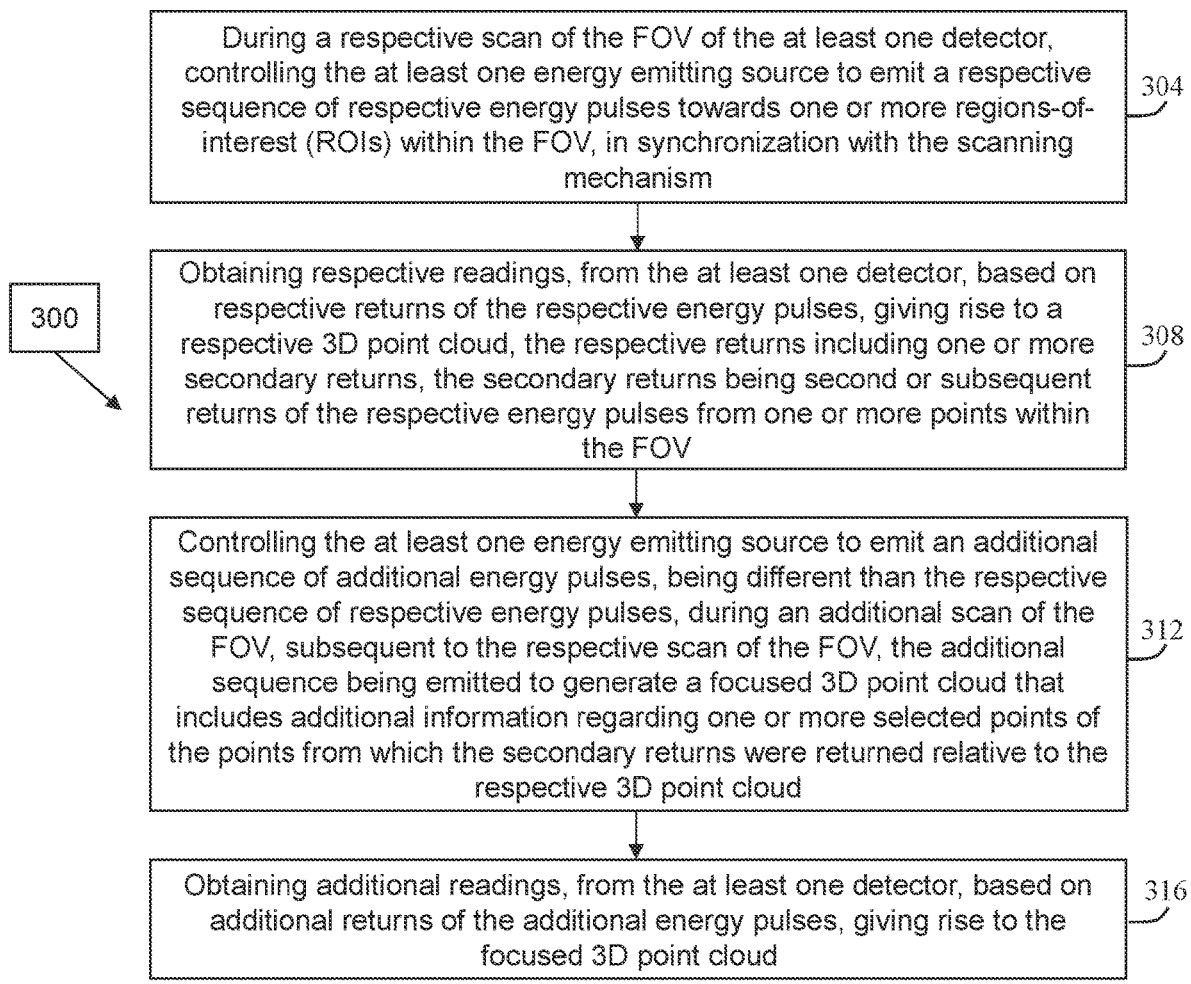
FIG. 3 is a flowchart illustrating a second example of a sequence of operations for generating a focused 3D point cloud, in accordance with the presently disclosed subject matter.

In embodiments of the presently disclosed subject matter, fewer, more and/or different stages than those shown in FIGS. 2 and 3 may be executed. In embodiments of the presently disclosed subject matter one or more stages illustrated in FIGS. 2 and 3 may be executed in a different order and/or one or more groups of stages may be executed simultaneously. FIG. 1 illustrates a general schematic of the system architecture in accordance with embodiments of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of a focused 3D point cloud generation system 100, in accordance with the presently disclosed subject matter.

In accordance with the presently disclosed subject matter, system 100 can be configured to include an active 3D scanner 110. Active 3D scanner 110 can be configured to include a scanning mechanism 120, at least one energy emitting source 130, and at least one detector 140.

Scanning mechanism 120 can be configured to scan a field-of-view (FOV) of the at least one detector 140. In some cases, scanning mechanism 120 can be a mechanical scanning mechanism, for example, a mechanical scanning array. Alternatively, in some cases, scanning mechanism 120 can be an optical scanning mechanism, for example, an optical phased array. As a further alternative, in some cases, scanning mechanism 120 can be an electronic scanning mechanism, for example, an electronically scanned array.

The at least one energy emitting source 130 can be configured to emit energy pulses, in synchronization with scanning mechanism 120. In some cases, the at least one energy emitting source 130 can be a Light Detection and Ranging (LiDAR), and the energy pulses can be laser pulses. In some cases, the at least one energy emitting source 130 can be a radar, and the energy pulses can be radio microwave pulses. In some cases, the radar can be a frequency-modulated continuous-wave (FMCW) radar.

The at least one detector 140 can be configured to provide readings based on returns of the energy pulses emitted by the at least one energy emitting source 130.

In some cases, active 3D scanner 110 can be mounted on a movable platform. In some cases, the platform can be a land-based platform. In some cases, the platform can be an airborne platform.

In some cases (not shown), system 100 can be configured to include a thermal sensor and/or illuminator, in addition to the active 3D scanner 110, to obtain additional readings from the FOV.

System 100 can further comprise, or be otherwise associated with, a data repository 150 (e.g. a database, a storage system, a memory including Read Only Memory—ROM, Random Access Memory—RAM, or any other type of memory, etc.) configured to store data. In some cases, the stored data can include point cloud representations of one or more potential objects within the FOV. In some cases, data repository 150 can be configured to enable retrieval and/or update and/or deletion of the stored data. It is to be noted that in some cases, data repository 150 can be distributed, while system 100 has access to the data that is stored therein, e.g. via a wired or wireless network to which system 100 is able to connect.

System 100 also comprises a processing circuitry 160. Processing circuitry 160 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data.

Processing circuitry 160 can be configured to include a focused 3D point cloud generation module 170. Focused 3D point cloud generation module 170 can be configured to generate a focused 3D point cloud that covers at least a part of the FOV of the at least one detector 140 including more information associated with one or more respective objects in the FOV than an earlier generated 3D point cloud (referred to hereinafter as a first 3D point cloud or a respective 3D point cloud) that covers, at least, the at least part of the FOV, as detailed further herein, inter alia with reference to FIGS. 2 and 3.

In some cases, the one or more respective objects can include one or more selected objects that are identified within the first 3D point cloud based on point cloud representations of one or more potential objects within the FOV, as detailed further herein, inter alia with reference to FIG. 2.

Additionally, or alternatively, in some cases, the one or more respective objects can include one or more objects that return secondary returns, being second or subsequent returns of energy pulses emitted by the at least one energy emitting source 130 towards the FOV, as detailed further herein, inter alia with reference to FIG. 3.

Mention is now drawn to FIG. 2, a flowchart illustrating a first example of a sequence of operations 200 for generating a focused 3D point cloud, in accordance with the presently disclosed subject matter.

In accordance with the presently disclosed subject matter, system 100 can be configured, e.g. using focused 3D point cloud generation module 170, to provide an objects data repository comprising point cloud representations of one or more potential objects within a FOV of the at least one detector 140 of the active 3D scanner 110 (block 204). In some cases, the point cloud representations can be wireframes.

During a first scan of the FOV, system 100 can be configured to control the at least one energy emitting source 130 to emit first energy pulses towards one or more regions-of-interest (ROIs) within the scanned FOV, being part of all of the FOV, in synchronization with the scanning mechanism 120 (block 208). Each of the ROIs can be mapped by one or more pixels in a first 3D point cloud that is generated based on first returns of the first energy pulses. In some cases, system 100 can be configured to control, for each pixel in the first 3D point cloud, whether to emit an energy pulse towards a point in the FOV that corresponds to the respective pixel. In some cases, system 100 can be configured to designate the ROIs within the scanned FOV based on mapping designation information, as detailed below.

In some cases, control of the at least one energy emitting source 130 to emit the first energy pulses can include selectively activating the at least one energy emitting source 130. In such cases, the at least one energy emitting source 130 can be activated (e.g., turned on) during a scan of the ROIs to emit the first energy pulses towards the ROIs. In contrast, the at least one energy emitting source 130 can be deactivated (e.g., turned off) during a scan of the part of the FOV that does not include the ROIs.

System 100 can be configured to obtain first readings, from the at least one detector 140, based on first returns of the first energy pulses, giving rise to a first 3D point cloud (block 212).

In some cases, system 100 can be configured, based on mapping designation information obtained by the system 100, to designate the ROIs within the FOV that are to be mapped during the first scan of the FOV (i.e., the ROIs towards which the first energy pulses are to be emitted during the first scan of the FOV) or a part of the FOV that is not to be mapped during the first scan of the FOV (i.e., the part of the FOV to which the first energy pulses are not to be emitted during the first scan of the FOV). Hereinafter, the phrase "designate the ROIs within the FOV that are to be mapped" or any variant thereof covers both designation of the ROIs within the FOV that are to be mapped and designation of a part of the FOV that is not to be mapped.

In some cases, the mapping designation information is not based on past readings obtained by the at least one detector 140. In some cases, the mapping designation information is not based on any 3D map that maps the FOV or a part thereof. Moreover, in some cases, the mapping designation information is not based on past readings obtained by the at least one detector 140 even when no such past readings are available, or even when no such past readings have been acquired.

In some cases, system 100 can be configured, based on mapping designation information, to designate, for one or more of the ROIs, a pixel resolution of pixels in the first 3D point cloud that cover the respective ROI. In some cases, system 100 can be configured to designate, for one or more of the ROIs, based on mapping designation information, a rate of emission of the first energy pulses that are to be emitted towards the respective ROI, wherein the rate of emission can be based, for example, to achieve the designated pixel resolution of the pixels in the first 3D point cloud that cover the respective ROI. In some cases, the designation of the rate at which to emit the first energy pulses towards the ROIs can be based on operational considerations.

In some cases, system 100 can be configured, based on mapping designation information, to designate energy levels (e.g., intensity levels) of one or more of the first energy pulses. In some cases, an energy level of a respective energy pulse of the first energy pulses can be designated based on a distance between the at least one energy emitting source 130 and a point in the FOV that is to be illuminated by the respective energy pulse. Additionally, or alternatively, in some cases, an energy level of the respective energy pulse can be based on an amplitude of a prior reading(s) by the at least one detector 140, which can, for example, be a function of: (a) a physical parameter(s) of the point(s) within the FOY that is (are) covered by the respective energy pulse and/or (b) environmental conditions between the active 3D scanner 110 and the point(s) within the FOV that are covered by the respective energy pulse (e.g., the first energy pulses that are emitted in degraded visual environment (DVE) conditions may be emitted at a higher energy level than the first energy pulses that are emitted in the absence of DVE conditions).

In some cases, system 100 can be configured to obtain at least some of the mapping designation information from a user of the system 100 (e.g., a pilot of an airborne platform on which the active 3D scanner 110 is mounted), e.g., via a computer-based user interface. In some cases, the user can indicate the ROIs to be mapped in the first 3D point cloud on a pre-loaded 3D map that is displayed to the user.

Additionally, or alternatively, in some cases, at least some of the mapping designation information that is obtained by the system 100 can be a line-of-sight (LOS) between a user of the system 100 and the FOV. In some cases, the LOS between the user of the system 100 and the FOV can be obtained by the system 100 from a tracker that tracks the LOS. For example, the user can designate points (e.g., continuously) within the FOY of the at least one detector 140 that are to be mapped in the first 3D point cloud, based on changes in the line-of-sight of the user with respect to the FOV, as reflected by the changes in the position of the tracker with respect to the FOV. In some cases, the tracker can be mounted on a helmet/Head-Mounted Display (HMD) worn by the user. System 100 can be configured to designate at least some of the ROIs towards which the first energy pulses are to be emitted based on the LOS between the user of the system 100 and the FOV.

It is to be noted that, in some cases, the user of the system 100 can designate ROIs to be mapped in the first 3D point cloud on a pre-loaded 3D map that is displayed to the user on a Head-Mounted Display (HMD) worn by the user.

In some cases, at least some of the mapping designation information that is obtained by system 100 can be a geolocation of one or more known objects within the FOV of the at least one detector 140, the known objects being known prior to the first scan of the FOV, and one or more mapping designation rules that are indicative of whether the known objects are to be mapped or are not to be mapped. For example, in the case that the active 3D scanner 110 is mounted on a moving airborne platform, one or more mapping designation rules can provide that structures on the ground along a path of the airborne platform are to be mapped or are not to be mapped. The geolocation of the known objects can be obtained from a geographical database or any other source that indicates a geolocation of objects within the FOV of the at least one detector 140, including, inter alia, a pre-loaded 3D map. System 100 can be configured to designate the ROIs within the FOV that are to be mapped based on the geolocation of the known objects within the FOV and the one or more mapping designation rules.

In some cases, at least some of the mapping designation information can be atmospheric information, for example, information regarding a degraded visual environment (DVE) (e.g., a foggy environment with limited visibility) within the FOV. For example, a mapping designation rule, also being mapping designation information, can provide that ROIs within the FOV that are affected by the DVE are to be mapped. In such cases, system 100 can be configured to designate these ROIs to be mapped.

In some cases, the mapping designation information can include a mapping designation rule that limits the points within the FOV of the at least one detector 140 that can potentially be mapped to points within a pre-defined distance of the at least one detector 140 and/or within a predefined angular range relative to the at least one detector 140. System 100 can be configured to designate the ROIs within the FOV that are to be mapped based on this mapping designation rule.

In some cases, in which the active 3D scanner 110 is mounted on a moving platform, system 100 can be configured to designate the ROIs that are to be mapped based on the following mapping designation information that is obtained by the system 100: (a) a pre-loaded 3D model of a mission area pre-loaded prior to the performance of a mission by the moving platform in the mission area, (b) a current location of the active 3D scanner 110, e.g. using a priori knowledge of its location with respect to the platform, and (c) one or more mapping designation rules (e.g., a rule that limits the points within the FOV of the at least one detector 140 that can potentially be mapped to points within a pre-defined distance of the at least one detector 140 and/or within a predefined angular range relative to the at least one detector 140).

In some cases, the pre-loaded 3D model can be a terrain elevation model (e.g., Data Terrain Model (DTM)/Digital Elevation Model (DEM)). In some cases, in which active 3D scanner 110 is mounted on a moving airborne platform, for example, on an underside of the airborne platform, system 100 can be configured to selectively activate the at least one energy emitting source 130 to only emit energy pulses that are expected to hit the ground or objects on the ground, in accordance with the terrain elevation model, a current location of the active 3D scanner 110, and a mapping designation rule that informs system 100 to map only points on the ground or objects on the ground, based on the terrain elevation model. In some cases, the terrain elevation model can be formed in accordance with the Digital Terrain Elevation Data (DTED) standard.

In some cases, at least some of the mapping designation information can be a decoded 2D image of at least some of the FOV of the at least one detector 140, and, optionally, one or more mapping designation rules, if any, as detailed earlier herein. By designating one or more of the ROIs in the FOV that are to be mapped in accordance with the decoded image, system 100 can compensate for momentary drifts or inaccuracies, and thereby better ensure that the at least one energy emitting source 130 does not emit the first energy pulses towards points in the FOV of the at least one detector 140 that are to be blanked.

In some cases, the decoded 2D image can display one or more objects that are present in the FOV of the at least one detector 140. Based on these objects and optionally one or more mapping designation rules, system 100 can designate one or more of the ROIs in the FOV that are to be mapped.

In some cases, at least some of the mapping designation information can be associated with one or more fixed coordinate areas within the FOV of the at least one detector 140, the fixed coordinate areas having fixed coordinates in a fixed coordinate system established in space. In some cases, the fixed coordinate areas within the FOV can be associated with one or more stationary objects.

In some cases, in which active 3D scanner 110 is mounted on a moving platform and a first 3D point cloud that is associated with the fixed coordinate areas has been generated based on first readings obtained by the at least one detector 140 while located at first coordinates in the fixed coordinate system, the first 3D point cloud can be projected into the FOV of the at least one detector 140 when the at least one detector 140 is located at second coordinates in the fixed coordinate system, and system 100 can be configured to update a designation of the ROIs within the FOV that are associated with the fixed coordinate areas in accordance with a change in a position and/or an orientation of the at least one detector 140 between the first coordinates and the second coordinates. As a non-limiting example, if at the first coordinates the at least one detector 140 was located five kilometers from a given fixed coordinate area and at the second coordinates the at least one detector 140 is located one kilometer from the given fixed coordinate area, the ROI within the FOV of the at least one detector 140 that is associated with the given fixed coordinate area when the at least one detector 140 is located at the second coordinates is of a greater percentage of the FOV than the ROI within the FOV of the at least one detector 140 that is associated with the given fixed coordinate area when the at least one detector 140 is located at the first coordinates. System 100 can be configured to update the designation of the ROI that is associated with the given fixed coordinate area based on the change in the position of the at least one detector 140 between the first coordinates and the second coordinates (e.g., designate a larger part of the FOV of the at least one detector 140 for obtaining energy pulses). Additionally, or alternatively, in some cases, the designation of the ROIs within the FOV can be continuously updated during a given scan of the FOV to compensate for movements of the platform during the given scan.

In some cases, in which active 3D scanner 110 is gimbaled to the moving platform by a gimbal and an orientation of the moving platform relative to the fixed coordinate areas changes between the generation of a first 3D point cloud that is associated with the fixed coordinate areas and the generation of a successive 3D point cloud, successive to the first 3D point cloud, that is associated with the fixed coordinate areas, the change in the orientation can be compensated, at least in part, by the gimbal (i.e., by providing a control signal for rotating the active 3D scanner 110 along the gimbal), such that the designation of the ROIs within the FOV does not need to be updated to account for any or all of the change in the orientation of the moving platform between the generation of the first 3D point cloud and the successive 3D point cloud.

In some cases, at least some of the mapping designation information can be associated with one or more moving objects within the FOV of the at least one detector 140. System 100 can be configured to generate a first 3D point cloud that includes a mapping of the moving objects. Due to the movement of the moving objects, a position and/or an orientation of the at least one detector 140 relative to the moving objects can change over time, whether or not active 3D scanner 110 is mounted on a moving platform. System 100 can be configured to update a designation of the ROIs within the FOV that are associated with the moving objects to compensate for the change in the position and/or the orientation of the at least one detector 140 relative to the moving objects between the generation of successive 3D point clouds.

In some cases, in which active 3D scanner 110 is gimbaled to a moving platform by a gimbal, a change in an orientation of the moving platform relative to the moving objects between the generation of a first 3D point cloud that is associated with the moving objects and the generation of a successive 3D point cloud, successive to the first 3D point cloud, that is associated with the moving objects can be compensated, at least in part, by the gimbal (i.e., by providing a control signal for rotating the active 3D scanner 110 along the gimbal), such that the designation of the ROIs within the FOV that are associated with the moving objects does not need to be updated to account for any or all of the change in the relative orientation between the active 3D scanner 110 and the moving objects between the generation of the first 3D point cloud and the successive 3D point cloud.

In some cases, in which active 3D scanner 110 is mounted on a platform, at least some of the mapping designation information can be indicative of a location of one or more energy-detecting sensors within the FOV of the at least one detector 140, and one or more of the ROIs within the FOV can be designated to prevent or limit the emission of first energy pulses towards one or more of the energy-detecting sensors (e.g., to reduce or prevent an exposure of the platform to the energy-detecting sensors, or to reduce or prevent the temporary blinding of the energy-detecting sensors by the first energy pulses, the energy-detecting sensors being on the platform or being external to the platform). Additionally, or alternatively, in some cases, system 100 can be configured to designate the ROIs within the FOV towards which the first energy pulses are to be emitted based on mapping designation information that limits a distance and/or an angular range over which the first energy pulses are allowed to travel (e.g., to reduce or prevent an exposure of the platform to energy-detecting sensors, to avoid emitting enemy pulses towards components of the platform (e.g., an external refueling pipe of an airborne platform), to limit the first energy pulses to an effective range of active 3D scanner 110 and/or to conserve energy resources of the system 100 (e.g., the energy consumption, the processing overhead required to generate the first 3D point cloud, etc.)).

In some cases, in which active 3D scanner 110 is mounted on an airborne platform, and in which the airborne platform is performing a landing approach to land at a selected landing area, system 100 can designate for mapping the ROIs within the FOV of the at least one detector 140 that are associated with the selected landing area (this being mapping designation information). In some cases, these ROIs can include one or more possible paths along which the airborne platform can be landed (e.g., to detect objects that are present along the possible paths). In this manner, the airborne platform can be safely landed. In addition, in some cases, one or more of the following may result: the exposure of the platform to energy detecting sensors may be reduced or prevented, the temporary blinding of energy-detecting sensors (on the platform or external to the platform) may be reduced or prevented, or energy resources of the system 100 may be conserved. Moreover, in some cases, system 100 can be configured to designate different pixel resolutions for different ROIs that are associated with the selected landing area (e.g., by designating different energy pulse emission rates for the different ROIs within the selected landing area), in accordance with an image resolution required for each of the different ROIs, thereby, among other things, conserving energy resources.

In some cases, in which active 3D scanner 110 is mounted on an airborne platform, and in which the airborne platform is flying along a flight path, system 100 can designate for mapping one or more ROIs within the FOV of the at least one detector 140 that are associated with one or more flight paths pre-approved tier flying the airborne platform (this being mapping designation information). This can result in one or more of the following advantages: reducing or preventing the exposure of the platform to energy detecting sensors, reducing or preventing the temporary blinding of energy-detecting sensors (on the platform or external to the platform), preventing an emission of energy pulses towards parts of the airborne platform (for example, an external refueling pipe), limiting the first energy pulses to an effective range of active 3D scanner 110, or conserving energy resources of the system 100. Moreover, in some cases, system 100 can be configured to designate different pixel resolutions for different ROIs that are associated with the pre-approved flight paths (e.g., by designating different energy pulse emission rates for the different ROIs), in accordance with an image resolution required for each of the different ROIs. This can also result in one or more of the advantages provided immediately above.

Returning to the sequence of operations 200, following the generation of the first 3D point cloud based on first returns of first energy pulses from one or more ROIs within the FOV of the at least one detector 140 during a first scan of the FOV, system 100 can be configured to analyze the first 3D point cloud, using the point cloud representations of the one or more potential objects within the FOY that are provided by the system 100, as detailed above, to identify one or more existing objects within the first 3D point cloud (block 216). In some cases, system 100, e.g. using processing circuitry 160, can be configured to utilize a terrain elevation model (e.g., DTM/DEM) to identify points of the first 3D point cloud that are associated with a terrain as indicated by the terrain elevation model before identifying the existing objects.

During a subsequent scan of the FOY of the at least one detector 140, subsequent to the first scan of the FOV, system 100 can be configured to control the at least one energy emitting source 130 to emit second energy pulses, wherein the second energy pulses directed at one or more selected objects of the existing objects are greater in number than the first energy pulses directed at the selected objects (block 220).

For example, if active 3D scanner 110 is mounted on an airborne platform that is performing a landing approach to land at a selected landing area, and one of the existing objects that is identified within the first 3D point cloud is an electrical power line along a path to the selected landing area, system 100 can be configured to direct more energy pulses to the electrical power line during the subsequent scan of the FOV than were directed to the electrical power line during the first scan of the FOV.

System 100 can be further configured to obtain subsequent readings, from the at least one detector 140, based on second returns of the second energy pulses, giving rise to the focused 3D point cloud including more information associated with the selected objects than the first 3D point cloud (block 224).

In some cases, the existing objects can include at least the selected objects and a second object not included in the selected objects. In some cases, system 100 can be configured to control the at least one energy emitting source 130 to emit fewer second energy pulses directed at the second object than the first energy pulses directed at the second object.

In some cases, system 100, e.g. using processing circuitry 160, can be configured to select one or more of the selected objects. In some cases, at least one of the selected objects can be a predefined object, predefined prior to performing the first scan of the FOV. In some cases, the predefined object can be predefined in accordance with operational requirements, e.g. operational requirements of a platform on which the active 3D scanner 110 is mounted. For example, for an airborne platform on which the active 3D scanner 110 is mounted, the predefined object can be predefined to assist the airborne platform to land or to fly at a low altitude. For example, the predefined object can be a utility pole along or in proximity to a landing path or a flying path of the airborne platform.

In some cases, at least one of the selected objects can be selected by the system 100 based on a line-of-sight between a user of the system 100 and the at least one of the selected objects. In some cases, this line-of-sight can be tracked by a tracker. In some cases, the tracker can be mounted on a helmet/Head-Mounted Display (HMD) worn by the user.

Additionally, or alternatively, in some cases, a user of the system 100 can be configured to directly select one or more of the selected objects. In some cases, the existing objects can be displayed on the HMD of a helmet worn by the user, and the user can select the selected objects based on the existing objects that are displayed on the HMD.

Attention is now drawn to FIG. 3, a flowchart illustrating a second example of a sequence of operations 300 for generating a focused 3D point cloud, in accordance with the presently disclosed subject matter.

In accordance with the presently disclosed subject matter, system 100, e.g. using focused 3D point cloud generation module 170, can be configured, during a respective scan of the FOV of the at least one detector 140, to control the at least one energy emitting source 130 to emit a respective sequence of respective energy pulses towards one or more regions-of-interest (ROIs) within the FOV, in synchronization with the scanning mechanism 120 (block 304). Each of the ROIs can be mapped by one or more pixels in a respective 3D point cloud that is generated based on respective returns of the respective energy pulses. In some cases, system 100 can be configured to control, for each pixel in the respective 3D point cloud, whether to emit an energy pulse towards a point in the FOV that corresponds to the respective pixel.

In some cases, the ROIs can be designated by the system 100 based on mapping designation information that is obtained by the system 100, as detailed earlier herein, inter alia with reference to FIG. 2. Additionally, or alternatively, in some cases, parameters that are associated with the respective energy pulses (e.g., pixel resolutions, rate of energy pulse emission, energy pulse intensity level) can be designated by the system 100 based on mapping designation information, as detailed earlier herein, inter alia with reference to FIG. 2. Exemplary sources for the mapping designation information and exemplary methods for providing the mapping designation information to the system 100 are detailed earlier herein, inter alia with reference to FIG. 2. Moreover, the designation of the ROIs can be updated by the system 100, as detailed earlier herein, inter alia with reference to FIG. 2.

In some cases, control of the at least one energy emitting source 130 to emit the respective energy pulses can include selectively activating the at least one energy emitting source 130. In such cases, the at least one energy emitting source 130 can be activated (e.g., turned on) during a scan of the ROIs to emit the respective energy pulses towards the ROIs. In contrast, the at least one energy emitting source 130 can be deactivated (e.g., turned off) during a scan of the part of the FOV that does not include the ROIs.

Returning to the sequence of operations 300, system 100 can be configured to obtain respective readings, from the at least one detector 140, based on respective returns of the respective energy pulses, giving rise to a respective 3D point cloud, the respective returns including one or more secondary returns, the secondary returns being second or subsequent returns of the respective energy pulses from one or more points within the FOV (block 308). Secondary returns of a respective energy pulse can occur, for example, when the respective energy pulse travels through a porous object within the FOV of the at least one detector 140 before striking a non-porous object within the FOV of the at least one detector 140, for example, a respective energy pulse that is emitted from the at least one energy emitting source 130 on an airborne platform through clouds or fog before striking a non-porous object (e.g., another airborne platform or other non-porous objects within the FOV), or a respective energy pulse that is emitted from the at least one energy emitting source 130 on an airborne platform towards the ground, wherein the respective energy pulse strikes a tree before it strikes a non-porous structure on the ground (e.g., a house).

System 100 can be configured to control the at least one energy emitting source 130 to emit an additional sequence of additional energy pulses, being different than the respective sequence of respective energy pulses, during an additional scan of the FOV, subsequent to the respective scan of the FOV, the additional sequence being emitted to generate a focused 3D point cloud that includes additional information regarding one or more selected points of the points from which the secondary returns were returned relative to the respective 3D point cloud (block 312). This increases the information value that is obtained from the selected points.

System 100 can also be configured to obtain additional readings, from the at least one detector 140, based on additional returns of the additional energy pulses, giving rise to the focused 3D point cloud (block 316).

The selected points can be some or all of the points from which the secondary returns were returned. In some cases, the selected points can be selected by analyzing the respective readings, from the at least one detector 140 (the respective readings being based on the respective returns of the respective energy pulses during the respective scan of the FOV), to determine one or more parameters that are associated with the secondary returns. In some cases, the parameters can be one or more of: an intensity of the secondary returns, or a type of object that is mapped based on the secondary returns. Based on one or more of the parameters that are associated with the secondary returns, system 100 can be configured to select the selected points towards which to emit the subsequent energy pulses.

In some cases, for one or more given points of the selected points, the additional energy pulses that are emitted towards the given points can strike the given points at a first angle of incidence that is different than a second angle of incidence at which the respective energy pulses that are emitted toward the given points strike the given points. In some cases, two or more scans can be performed subsequent to the respective scan, wherein for one or more given points of the selected points, the energy pulses that are emitted towards the given points can strike the given points at a different angle of incidence during each scan, including the respective scan. In this manner, the given points are mapped in the focused 3D point cloud to reflect the secondary returns of the respective energy pulses that are emitted towards the given points and the additional returns of the additional energy pulses that are emitted towards the given points.

Additionally, or alternatively, in some cases, for one or more given points of the selected points, the subsequent energy pulses that are emitted towards the given points can be greater in number than the respective energy pulses that are emitted towards the given points.

It is to be noted that, with reference to FIGS. 2 and 3, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for generating a focused three-dimensional (3D) point cloud, the system comprising:
   an active 3D scanner, comprising:
      at least one detector;

a scanning mechanism configured to scan a field-of-view (FOV) of the at least one detector; and at least one energy emitting source configured to emit energy pulses, in synchronization with the scanning mechanism; and a processing circuitry configured to:

during a respective scan of the FOV, control the at least one energy emitting source to emit a respective sequence of respective energy pulses towards one or more regions-of-interest (ROIs) within the FOV, in synchronization with the scanning mechanism;

obtain respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV;

control the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points from which the secondary returns were returned relative to the respective 3D point cloud, the additional information being provided to increase an information value that is obtained from the selected points; and obtain additional readings, from the at least one detector, based on additional returns of the additional energy pulses, giving rise to the focused 3D point cloud.

2. The system of claim 1, wherein, for one or more given points of the selected points, the additional energy pulses that are emitted towards the given points strike the given points at a first angle of incidence that is different than a second angle of incidence at which the respective energy pulses that are emitted towards the given points strike the given points, wherein the given points are mapped in the focused 3D point cloud to reflect the secondary returns of the respective energy pulses that are emitted towards the given points and the additional returns of the additional energy pulses that are emitted towards the given points.

3. The system of claim 1, wherein, for one or more given points of the selected points, the additional energy pulses that are emitted towards the given points are greater in number than the respective energy pulses that are emitted towards the given points.

4. The system of claim 1, wherein the processing circuitry is further configured to:

analyze the respective readings to determine one or more parameters that are associated with the secondary returns, and select the selected points based on one or more of the parameters.

5. The system of claim 1, wherein the at least one energy emitting source is a Light Detection and Ranging (LiDAR), and wherein the energy pulses are laser pulses.

6. The system of claim 1, wherein the at least one energy emitting source is a radar, and wherein the energy pulses are radio pulses.

7. The system of claim 6, wherein the radar is a frequency-modulated continuous-wave (FMCW) radar.

8. A method for generating a focused three-dimensional (3D) point cloud, the method comprising:

during a respective scan of a field-of-view (FOV) of at least one detector of an active 3D scanner by a scanning mechanism of the active 3D scanner, controlling at least one energy emitting source of the active 3D scanner to emit a respective sequence of respective energy pulses towards one or more regions-of-interest (ROIs) within the FOV, in synchronization with the scanning mechanism;

obtaining respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV;

controlling the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points relative to the respective 3D point cloud, the additional information being provided to increase an information value that is obtained from the selected points; and obtaining additional readings, from the at least one detector, based on additional returns of the additional energy pulses, giving rise to the focused 3D point cloud.

9. The method of claim 8, wherein, for one or more given points of the selected points, the additional energy pulses that are emitted towards the given points strike the given points at a first angle of incidence that is different than a second angle of incidence at which the respective energy pulses that are emitted towards the given points strike the given points, wherein the given points are mapped in the focused 3D point cloud to reflect the secondary returns of the respective energy pulses that are emitted towards the given points and the additional returns of the additional energy pulses that are emitted towards the given points.

10. The method of claim 8, wherein, for one or more given points of the selected points, the additional energy pulses that are emitted towards the given points are greater in number than the respective energy pulses that are emitted towards the given points.

11. The method of claim 8, further comprising:

analyzing the respective readings to determine one or more parameters that are associated with the secondary returns; and selecting the selected points based on one or more of the parameters.

12. The method of claim 8, wherein the at least one energy emitting source is a Light Detection and Ranging (LiDAR), and wherein the energy pulses are laser pulses.

13. The method of claim 8, wherein the at least one energy emitting source is a radar, and wherein the energy pulses are radio pulses.

14. The method of claim 13, wherein the radar is a frequency-modulated continuous-wave (FMCW) radar.

15. A non-transitory computer readable storage medium having computer readable program code embodied therewith, the computer readable program code, executable by processing circuitry of a computer to perform a method for generating a focused three-dimensional (3D) point cloud, the method comprising:

during a respective scan of a field-of-view (FOV) of at least one detector of an active 3D scanner by a scanning mechanism of the active 3D scanner, controlling at least one energy emitting source of the active 3D scanner to emit a respective sequence of respective energy pulses towards one or more regions-of-interest (ROIs) within the FOV, in synchronization with the scanning mechanism;

obtaining respective readings, from the at least one detector, based on respective returns of the respective energy pulses, giving rise to a respective 3D point cloud, the respective returns including one or more secondary returns, the secondary returns being second or subsequent returns of the respective energy pulses from one or more points within the FOV;

controlling the at least one energy emitting source to emit an additional sequence of additional energy pulses, being different than the respective sequence of respective energy pulses, during an additional scan of the FOV, subsequent to the respective scan, the additional sequence being emitted to generate a focused 3D point cloud that includes additional information regarding one or more selected points of the points relative to the respective 3D point cloud, the additional information being provided to increase an information value that is obtained from the selected points; and obtaining additional readings, from the at least one detector, based on additional returns of the additional energy pulses, giving rise to the focused 3D point cloud.

\* \* \* \* \*